United States Patent
Gibson

(10) Patent No.: US 9,349,170 B1
(45) Date of Patent: May 24, 2016

(54) SINGLE IMAGE CONTRAST ENHANCEMENT METHOD USING THE ADAPTIVE WIENER FILTER

(71) Applicant: The United States of America as represented by the Secretary of the Navy, San Diego, CA (US)

(72) Inventor: Kristofor B. Gibson, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 50 days.

(21) Appl. No.: 14/501,400

(22) Filed: Sep. 30, 2014

Related U.S. Application Data

(60) Provisional application No. 62/045,953, filed on Sep. 4, 2014.

(51) Int. Cl.
G06K 9/40 (2006.01)
G06T 5/10 (2006.01)
G06T 5/00 (2006.01)

(52) U.S. Cl.
CPC . G06T 5/10 (2013.01); G06T 5/002 (2013.01); G06T 2207/10004 (2013.01); G06T 2207/20182 (2013.01)

(58) Field of Classification Search
None
See application file for complete search history.

(56) References Cited

U.S. PATENT DOCUMENTS

| 5,841,911 A * | 11/1998 | Kopeika | G06T 5/003 382/254 |
| 8,437,568 B2 * | 5/2013 | Hou | G06T 5/002 382/254 |
| 8,774,555 B2 | 7/2014 | Xianghui | |
| 2011/0188775 A1 | 8/2011 | Sun et al. | |

OTHER PUBLICATIONS

Hung et al.; "Single image super-resolution using iterative Wiener filter"; Mar. 2012; Acoustics, Speech and Signal Processing (ICASSP) IEEE International Conference' 1269-1272.*
He, Kaiming et al., "Sinale Image Haze Removal Using Dark Channel Prior," IEEE Transactions on Pattern Analysis and Machine Intelligence, vol. 33, No. 12, pp. 2341-2353, Dec. 2011.
Tarel, Jean-Phillippe et al., "Fast Visibility Restoration from a Single Color or Gray Level Image", IEEE International Conference on Computer Vision, Kyoto, pp. 2201-2208, Sep. 2009.

(Continued)

Primary Examiner — Eueng-Nan Yeh
(74) Attorney, Agent, or Firm — SPAWAR Systems Center Pacific; Kyle Eppele; Ryan J. Friedl

(57) ABSTRACT

A method involves using an adaptive wiener filter to generate a veiling estimate for a dark channel prior of each pixel in a single image having a contrast reducing scattering medium therein, where a global noise variance for the image is used to generate the veiling estimate and the global noise variance is naively estimated using all of the pixels in the image. A first contrast enhanced image is generated using a transmission calculated from the veiling estimate. The global noise variance is updated using statistics determined from the first contrast enhanced image, along with a second veiling estimate. A second contrast enhanced image is generated using the updated global noise variance, the second veiling estimate, and the local statistics from the original image.

20 Claims, 6 Drawing Sheets

(56) References Cited

OTHER PUBLICATIONS

Shuai, Yanjuan et al., "Image Haze Removal of Wiener Filtering Based on Dark Channel Prior", IEEE Eighth International Conference on Computational Intelligence and Security, pp. 318-322, 2012.
Yu, Jing et al., "Physics-Based Fast Single Image Fog Removal", IEEE 10th International Conference on Signal Processing, pp. 1048-1052, 2010.
Arora, Tarun, "Evaluation of a New Integrated Fog Removal Algorithm IDCP with Airlight", I.J. Image, Graphics and Signal Processing, vol. 8, pp. 12-18, 2014. Aug. 2, 2014.
Hardie, Russell, "A Fast Image Super-Resolution Algorithm Using an Adaptive Wiener Filter", IEEE Transactions on Image Processing, vol, 16. No. 12, pp. 2953-2964, Dec. 2007.
Tan, Robby, "Visibility in Bad Weather from a Single Image", IEEE Conference on Computer Vision and Pattern Recognition, pp. 1-8, Jun. 2008.
Fattal, Raanan, "Single Image Dehazing", ACM Transactions on Graphics, vol. 27, pp. 72:1-72:9, Apr. 2008.
Gibson, K.B. et al., "An Investigation of Dehazing Effects on Image and Video Codina", Image Processing, IEEE Transactions on, vol. 21, No. 2, pp. 662-673, Feb. 2012.
Long, J. et al., "Fast haze removal for a single remote sensing image using dark channel prior", Computer Vision in Remote Sensing (CVRS), 2012 International Conference on, pp. 132-135, Dec. 2012.

\* cited by examiner

10

1: procedure ADAPTIVEWIENER($d, \mu_d, \sigma_d^2, \sigma_n^2$)
2: $\quad \hat{v} \leftarrow \mu_{d,i} + \frac{\min(\sigma_{d,i}^2 - \sigma_n^2, 0)}{\sigma_{d,i}^2}(d_i - \mu_{d,i}) \triangleright \forall i$ pixels in image
3: $\quad$ return $\hat{v}$
4: end procedure

1: procedure WIENERDEFOG(y, $\Omega$, $t_0$, $w$, steps)
2: $\quad$ $\triangleright$ First Step
3: $\quad$ a is estimated from [5, 11, 7]
4: $\quad$ $d' \leftarrow$ from (6)
5: $\quad$ $\hat{\mu}_v', \sigma_v^{2'} \leftarrow$ from (9) and (10) using $d'$
6: $\quad$ $\sigma_z^2 \leftarrow \sigma_z^2 + \sigma_{v,i}^{2'}/M$ $\quad \triangleright$ For all $M$ pixels in image
7: $\quad$ $\hat{v}' \leftarrow$ *AdaptiveWiener*($d', \hat{\mu}_v', \sigma_v^{2'}, \sigma_z^2$)
8: $\quad$ $\hat{t}' \leftarrow 1 - w\hat{v}'$ $\quad \triangleright$ For all pixels
9: $\quad$ $\hat{x}' \leftarrow$ from (4) with y, $\hat{t}'$, a, and $t_0$
10: $\quad$ if *steps* == 1 then
11: $\quad\quad$ return $\hat{x}_{w_1}, \hat{t}_{w_1}$
12: $\quad$ end if
13: $\quad$ $\triangleright$ Second Step
14: $\quad$ $d \leftarrow$ from (7) using $\hat{x}_{w_1}$ instead of y
15: $\quad$ $\hat{\sigma}_v^2 \leftarrow$ from (9) and (10) using $d$
16: $\quad$ $\sigma_n^2 \leftarrow \sigma_n^2 + \sigma_{v,i}^2/M$ $\quad \triangleright$ For all $M$ pixels in image
17: $\quad$ $\hat{v} \leftarrow$ *AdaptiveWiener*($d, \hat{\mu}_v', \sigma_v^{2'}, \sigma_n^2$)
18: $\quad$ $\hat{t} \leftarrow 1 - w\hat{v}$ $\quad \triangleright$ For all pixels
19: $\quad$ $\hat{x} \leftarrow$ from (4) with y, $\hat{t}$, a, and $t_0$
20: $\quad$ return $\hat{x}_{w_2}, \hat{t}_{w_2}$
21: end procedure

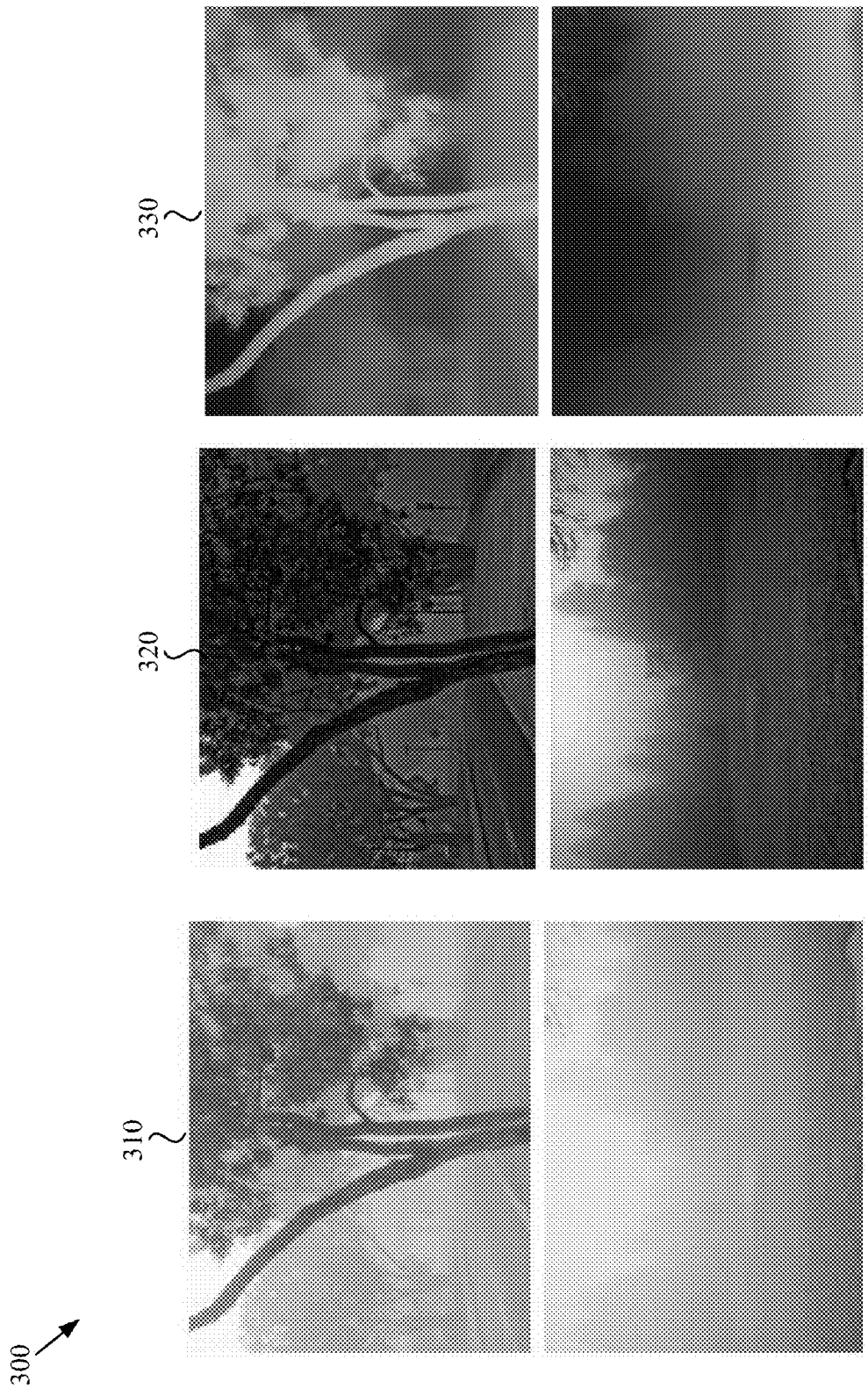

SINGLE IMAGE CONTRAST ENHANCEMENT METHOD USING THE ADAPTIVE WIENER FILTER

CROSS-REFERENCE TO RELATED APPLICATIONS

This application claims the benefit of U.S. Provisional Patent Application Ser. No. 62/045,953 filed Sep. 4, 2013, entitled "Fast Single Image Fog Removal Method Using the Adaptive Wiener Filter", the content of which is fully incorporated by reference herein.

FEDERALLY SPONSORED RESEARCH AND DEVELOPMENT

The Single Image Contrast Enhancement Method Using the Adaptive Wiener Filter is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103375.

BACKGROUND

Contrast enhancement is often needed for image and video capture applications due to lens configurations, haze, or fog. Possible scenarios where contrast enhancements are needed include a vehicle driving down a foggy road or a surveillance camera viewing through a fog layer near the ocean. To obtain higher contrast imagery immediately, each image or frame from a video stream (un-compressed) is needed to be enhanced in near-real time.

In the case of foggy images, single image contrast enhancement attempts to estimate the amount of fog that exists in an image and then removes the fog, resulting in a contrast enhanced image. A common problem with fog in scenes is that the amount of contrast degradation is spatially varying. This can be seen in everyday life by observing the amount of haze present in front of two distant mountains. The furthest mountain appears hazier. This effect has been an important technique by artists for conveying scene depth on a two dimensional canvas.

One attempt to solving the contrast problem is to employ Histogram Equalization (HE), a statistical contrast enhancement method where the probability distribution function (PDF) of the image is transformed to be more uniform. Another similar approach is to enforce Gray-Level-Grouping, which also achieves spreading the original PDF while reserving dark and/or light pixels. However, these statistical methods attempt to achieve a desired PDF structure for an image without knowledge of the scene's physical parameters. A need exists for a contrast enhancement method that takes advantage of prior knowledge of an image scene.

BRIEF DESCRIPTION OF THE DRAWINGS

FIG. 1 shows a diagram illustrating the processing for an embodiment of a Locally Adaptive Wiener Filter.

FIG. 2 shows a diagram illustrating the processing for an embodiment of a method in accordance with the Single Image Contrast Enhancement Method Using the Adaptive Wiener Filter.

FIGS. 4A-4C show before, after, and transmission images illustrating a one-step embodiment of the Single Image Contrast Enhancement Method Using the Adaptive Wiener Filter.

DETAILED DESCRIPTION OF SOME EMBODIMENTS

Figure 3A:
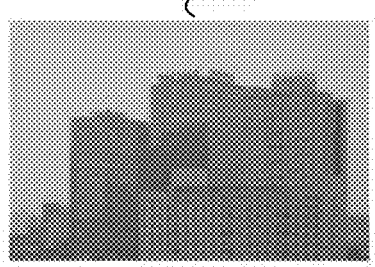
FIGS. 3A-3E show before, after, and transmission images illustrating one-step and two-step embodiments of the Single Image Contrast Enhancement Method Using the Adaptive Wiener Filter.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein describe a contrast enhancement that is based on the physics model of the scene to obtain an arbitrary to scale image of scene depth and an enhanced image. The disclosed method achieves faster processing speed for purposes including near real-time uncompressed video processing. Due to the simplicity of the disclosed method, which estimates local statistics with a linear filter, images are processed in a fraction of a second compared with seconds to minutes of other methods.

Enhancing the contrast of a single image affected by a contrast reducing scattering medium, such as fog, haze, water, or dust, is an under constrained problem that requires an inference method or prior knowledge of the scene. The amount of a contrast reducing scattering medium observed in an image is dependent on the distance of the object to the camera, wavelength of the light, and the size of the scattering particles in the medium. Given a contrast degraded image at pixel location i, $y_i \in \mathbb{R}^3$, the contrast enhanced version $x_i \in \mathbb{R}^3$ is related to the contrast degraded image with the atmospheric dichromatic model, $$y_i = t_i x_i + (1-t_i)a, \quad \text{(Eq. 1)}$$

where the airlight estimated from the scene is $a \in \mathbb{R}^3$, $x_i$ is the enhanced pixel value, and transmission is $t_i \in \mathbb{R}$. The right hand side of (Eq. 1) is considered the veiling, $$v = (1-t_i)a. \quad \text{(Eq. 2)}$$

For the embodiments of the method disclosed herein, one application is for scenes with fog or at least wavelength independent atmospheric scattering. This allows the transmission to be a scalar quantity which validates the model in (Eq. 1). The transmission is then dependent on a homogenous (spatially-invariant) β term and scene depth $r_i$, $$t_i = e^{-\beta r_i}. \quad \text{(Eq. 3)}$$

If all of the desired parameters are known, then the contrast enhanced image is obtained with $$\hat{x}_i = \frac{y_i - \alpha}{\min(t_i, t_0)} + \alpha \quad \text{(Eq. 4)}$$

where $t_0$ is chosen for numerical soundness, where $\hat{x}_i$ is the enhanced pixel value, where a is the airlight estimated from the scene, and $y_i$ is a contrast degraded image of the single image y at pixel location i. As an example, $t_0 = 0.01$.

Traditionally, single image contrast enhancement methods estimate the veiling $v = va$, which is composed of the transmission t and airlight a (see (Eq. 2)). In some embodiments of the method disclosed herein, the airlight is known or estimated beforehand. Methods of estimating the airlight are known to those having ordinary skill in the art. The next step is to estimate the scalar veiling component. If an assumption is made that one or more of the color components of x is dark, then the minimum of all of the color components from y may be determined and the veiling may be measured with $$v = d_i a, \quad \text{(Eq. 5)}$$

and $$d_i = \min_{c \in (r,g,b)} y_i(c), \quad \text{(Eq. 6)}$$

where the $c^{th}$ color component of y is y(c). This method of measuring a "dark prior" or "whiteness" of the image, d, may be used in single image contrast enhancement methods as the first step in estimating the transmission or veiling. Although the above approach discusses a color image ($y_i \in \mathbb{R}^3$), this method can also be used for monochromatic images (grayscale or Bayer color format). For monochromatic image, $y_i \in \mathbb{R}$, the "dark prior" is simply the input image, $d_i = y_i$.

The observation d from (Eq. 6) used as an estimate for veiling contains significant noise and needs refinement. This noise is due to many factors. Although statistically supported for natural scenes, the assumption that at least one color component of a radiant object is zero is not necessarily valid. An example is when a bright colored paved road appears to be the same color as the horizon. There is ambiguity in distinguishing the range of the road with respect to the horizon.

Another factor that contributes to the noise component is the texture of the scene. As modeled in (Eq. 2) and (Eq. 3), the veiling is expected to be representative of the scene depth. The depth variation in scenes is typically piece-wise smooth and void of any texture components. The texture is not desired and needs to be removed to have an accurate veiling estimation. Otherwise, false colors are introduced when enhancing with (Eq. 4).

As disclosed herein, the locally adaptive Wiener filter is used to refine the initial veiling estimate rather than as noise removal for the contrast enhanced image. The embodiments of the method estimate v at pixel location i given the observation model $$d_i = v_i + n_i, \quad \text{(Eq. 7)}$$

where the observation is characterized as the desired veiling and additive noise (texture, color ambiguity). The random observation $d_i$ is locally stationary within a sample window, $\Omega_i$, both centered at pixel location i. The signals outside the window are uncorrelated. The veiling is considered a random variable with a mean and variance, $v = (\mu_v + \sigma_v^2 \omega_i)$ and with $\omega_i \sim N(0,1)$. The noise is also zero mean but with a variance of $\sigma_n^2$, $n \sim N(0, \sigma_n^2)$. The veiling and noise are expected to be independent, $E[vn] = E[v]E[n]$.

Given (Eq. 7), the Locally Adaptive Wiener filter within each sample window $\Omega_i$ that estimates the atmospheric veil is $$\hat{v}_i = \mu_{v,i} + \frac{\sigma_{v,i}^2 - \sigma_n^2}{\sigma_{v,i}^2}(d_i - \mu_{v,i}), \quad \text{(Eq. 8)}$$

where $\hat{v}_i$ is the veiling estimate, $\sigma_n^2$ is the global noise variance, $\mu_{v,i}$ is a local mean of the sample window $\Omega_i$ and $\sigma_{v,i}^2$ is a local variance of the sample window $\Omega_i$. The strength in this approach is that although simple to implement, the filter can adapt for scene depth discontinuities. It applies a weight $$\frac{\sigma_{v,i}^2 - \sigma_n^2}{\sigma_{v,i}^2},$$

where if it is low then the smoothed sample is chosen, whereas if the weight is high then the original signal is preserved. This bilateral filtering technique is effective for smoothing textures and preserving depth discontinuities.

The difficulty with (Eq. 8) is that the mean and variances are not known. One approach is to use the signal itself to estimate the local mean and variances, $$\hat{\mu}_{v,i} = \frac{1}{|\Omega_i|} \sum_{j \in \Omega_i} d_i, \quad \text{(Eq. 9)}$$

$$\hat{\sigma}_{v,i}^2 = \frac{1}{|\Omega_i|} \sum_{j \in \Omega_i} d_i^2 - \hat{\mu}_v^2, \quad \text{(Eq. 10)}$$

where $|\Omega_i|$ is the number of pixels within the local sample window, where j is a pixel within the sample window $\Omega_i$, and $\hat{\mu}_v^2$ is an estimate of the local average veiling measured within the sample window $\Omega_i$. The general algorithm for the Adaptive Wiener Filter is shown in FIG. 1.

To estimate the noise variance, the embodiments of the method disclosed herein take a naive approach and assume that (Eq. 7) is valid; v and n are not correlated and the mean of n is zero. The variance of the observation in (Eq. 7) becomes $$\text{var}[d_i] = \sigma_{d,i}^2 = \sigma_{v,i}^2 + \sigma_n^2. \tag{Eq. 11}$$

The transmission, hence veiling, is expected to be correlated for large sample windows and exhibit low signal variance $\sigma_v^2$. It is naively assumed that $\sigma_v^2 \ll \sigma_n^2$ throughout the image and the noise variance is approximated as a global average of the observation variance, $$\hat{\sigma}_n^2 = \frac{1}{M} \sum_{j=0}^{M-1} \sigma_{d,j}^2, \tag{Eq. 12}$$

where $\sigma_{v,j}^2 = \sigma_{d,j}^2$, which is defined in (Eq. 10), where j is a pixel in y, $\hat{\sigma}_n^2$ is an estimate of the global noise variance, $\sigma_{d,j}^2$ is the local veiling variance measured within the sample window $\Omega_j$, and M is the total number of pixels in the entire image. Here, a naive estimate is indicated with the superscript '.

A problem with (Eq. 12) is that the noise variance is dependent on the amount of the contrast reducing scattering medium. Using fog as an example, the texture of scene objects is attenuated by the fog and reduces the observation local variance. The depth discontinuities exhibiting high variance in the veiling v will also correlate with edges in the image observation d. This noise dependence invalidates the model in (Eq. 7) because the noise and signal must be uncorrelated in order to develop the filter in (Eq. 8). The embodiments of the disclosed method estimate an uncorrelated noise by examining the non-contrast degraded scene component, which can be considered a composition of a low-resolution and hi-resolution (texture, noise) component $$x_i = x_{L,i} + x_{H,i}. \tag{Eq. 13}$$

The higher resolution component is a color independent random variable, $$x_{H,i} = n\mathbf{1}, \tag{Eq. 14}$$

where 1 is a 3×1 column vector of ones. The variance of the white noise component n is $\sigma_n^2$ and the mean is zero.

If the observation in (Eq. 6) is expanded and it is assumed that the transmission is constant within the sample region, without loss of generality, let the known airlight be white $a(c)=1 \forall c$, and $$x_d = \min_{c \in (r,g,b)} x_L(c), \tag{Eq. 15}$$

then the observation becomes $$d = v + (1-v)(x_d + n) = v + z, \tag{Eq. 16}$$

where z is a multiplicative noise component which is correlated with the desired veiling component.

The model in (Eq. 16) is invalid for developing an Adaptive Wiener Filter because the additive noise to v must be white. There exists methods to account for this signal dependent noise, but a parameter is still required for estimating the correct noise component. To eliminate the need to select a parameter for estimating the multiplicative noise component, a different approach is used to decorrelate the noise, z, to obtain the white noise n by using a naively estimated contrast enhanced image $\hat{x}'$.

First, the veiling $\hat{v}'$ is naively estimated with (Eq. 12) as the noise variance parameter. Then, the naive contrast enhanced image $\hat{x}'$ is obtained with (Eq. 4). A new observation, $d = \min_{c \in (r,g,b)} \hat{x}'(c)$, is obtained and the new signal noise variance is estimated. This new signal variance can then be supplied to the Adaptive Wiener Filter to obtain the final veiling estimate and hence the final contrast enhanced image $\hat{x}$.

The one-step Wiener and two-step contrast enhancement methods are denoted with $$\hat{x}'_{\omega_1}, \hat{t}'_{\omega_1} \leftarrow \text{WienerDefog}(y, \Omega, t_0, \omega, 1) \tag{Eq. 17}$$

and $$\hat{x}'_{\omega_2}, \hat{t}'_{\omega_2} \leftarrow \text{WienerDefog}(y, \Omega, t_0, \omega, 2) \tag{Eq. 18}$$

respectively where the detailed algorithm 100 is shown in FIG. 2 and the original image having a contrast reducing scattering medium therein is y. As an example, $\omega = 0.9$ and $t_0 = 0.001$.

As an example, the two-step Wiener contrast enhancement method may be selected when the first contrast enhanced image has edges that appear like "halos" or exhibit "burn-in" appearances. The one-step contrast enhancement method may be used for most scenes with less severe depth discontinuities. The embodiments of the disclosed methods involve estimation of local statistics. These local statistics are measured within a square shaped moving sample window $\Omega$ with a size K×K pixels. As an example, the size of the window may be at least 32×32 pixels for digital images.

In some embodiments, the sample window size is adjusted for each image to improve subjective performance. For example, the window sizes varied from 22×22 pixels to 45×45 pixels. In such embodiments, the approach to estimating the optimum window size $|\Omega|$ is to choose a size sufficient enough to filter scene texture noise from the observation $\hat{\mu}_y$ in (Eq. 9) to a desired variance $\sigma_{e,\Omega}^2$, $$\sigma_{e,\Omega}^2 = \frac{\hat{\sigma}_{n_{txt}}^2}{|\Omega|} \Longrightarrow |\Omega| = \frac{\sigma_{n_{txt}}^2}{\sigma_{e,\Omega}^2} \tag{Eq. 19}$$

As an example $\sigma_{e,\Omega}^2$ may be equal to $5e^{-6}$. To determine $|\Omega|$, the variance of the texture is estimated. Taking the maximum variance from the local variance measurement $\hat{\sigma}_v^2(x)$ in (Eq. 10) is not practical since the higher variance measurements are from the depth discontinuities and edges in the scene. The goal in smoothing d is to preserve these edges. One approach is to estimate the texture noise in an image. The approach is to measure the average variance in all color channels from the observed image i(x), $$\sigma_{n_{txt}}^2 = \frac{1}{3} \frac{1}{M} \sum_{c=1}^{3} \sum_{\forall x} \hat{\sigma}_{i,c}^2(x), \tag{Eq. 20}$$

where $$\hat{\mu}_{i,c}^2(x) = \frac{1}{|\Phi(x)|} \sum_{y \in \Phi(x)} i_c(y), \tag{Eq. 21}$$

$$\hat{\sigma}_{i,c}^2(x) = \frac{1}{|\Phi(x)|} \sum_{y \in \Phi(x)} i_c^2(y) - \hat{\mu}_{i,c}^2(x), \quad \text{(Eq. 22)}$$

and where M is the total number of pixels in an image. A sample window size $|\Phi|$ is selected initially in order to estimate the local mean and variance of the image.

Further, in some embodiments of the method disclosed herein, the airlight may be estimated using a common method where it is assumed if the sky is present in an image (t=0), then the brightest pixels are the actual airlight color a. A practical implementation is to pick the 0.1% darkest pixels in the transmission estimate $\hat{t}$ to estimate the airlight $a=(a_1, a_2, a_3)^T$, $$a_c = \frac{1000}{M} \sum_y i_c(y) : \hat{t}(y) \le T, \quad \text{(Eq. 23)}$$

where T represents a threshold chosen such that there are M/1000 pixels that have a value lower than T.

Figure 3B:
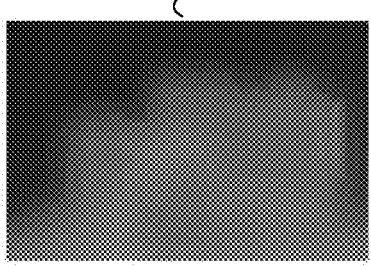
Figure 3C:
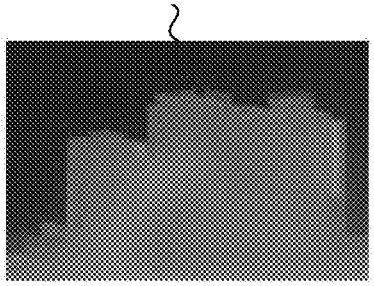
Figure 3D:
Figure 3E:
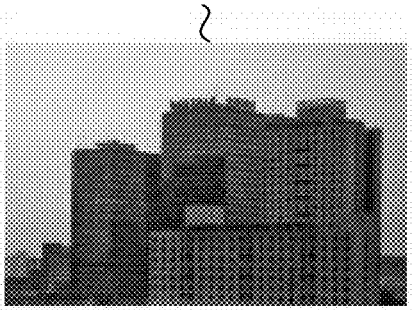

The estimation of the noise variance helps preserve scene depth discontinuities in the veiling (hence transmission) estimate. FIGS. 3A-3E show the importance of updating the noise variance estimate. FIG. 3A shows an original image 210 having a contrast reducing scattering medium, specifically fog. FIG. 3B shows the transmission $\hat{t}_{\omega_1}$ 220 from a one-step Wiener contrast enhancement performed, while FIG. 3C shows the transmission $\hat{t}_{\omega_2}$ 230 from a two-step Wiener contrast enhancement performed, using the embodiments of the method disclosed herein. FIG. 3D shows the resulting image 240 from the one-step Wiener contrast enhancement and FIG. 3E shows the resulting image 250 from the two-step Wiener contrast enhancement.

As shown in FIG. 3B, the building tops are blurred. This is due to the local estimate of $\hat{\sigma}'_v$ being either equal to or lower than the estimated global noise variance $\sigma_n^{2'}$. After estimating the global noise variance with a naive contrast enhanced image, the tops of the buildings (edges and corners) are preserved in image 230 shown in FIG. 3C. Of note, the contrast enhanced image 240 is improved with an updated noise variance estimate. The blurred depth discontinuities in the transmission estimate causes the contrast enhanced image 240 to appear to have "burned" edges as seen on the building edges in FIG. 3D. As shown in the second contrast enhanced image 250, this "burn in" is removed after updating the noise variance.

FIGS. 4A-4C show additional images 300 depicting the use of the one-step embodiment of the Single Image Contrast Enhancement Method Using the Adaptive Wiener Filter on natural scenery. FIG. 4A shows original images 310, FIG. 4B shows contrast enhanced images 320, and FIG. 4C shows transmission images 330.

Figure 5:
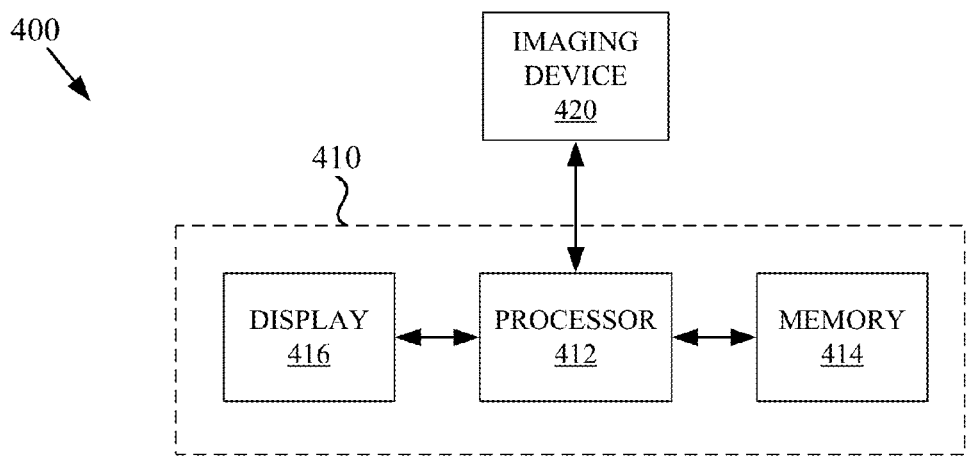
FIGS. 5 and 6 show diagrams illustrating embodiments of a system configured to perform the methods in accordance with the Single Image Contrast Enhancement Method Using the Adaptive Wiener Filter.

FIG. 5 show a diagram 400 illustrating an embodiment of a system 410 configured to perform the methods in accordance with the Single Image Contrast Enhancement Method Using the Adaptive Wiener Filter. System 410 includes a processor 412 operatively connected, such as via a wired or wireless connection, to a memory module 414 and display 416. Processor 412 may be a general purpose processing device or a processing device specifically programmed to perform the embodiments of the method disclosed herein. Memory module 414 is configured to store various types of data therein and may include computer-implementable instructions stored therein for performing the embodiments of the method, such as method 600, disclosed herein. Display 416 may comprise a general purpose display device as recognized by one having ordinary skill in the art. System 410 is operatively connected, such as via a wired or wireless connection, to an imaging device 420, which may comprise any type of image capture device known in the art, such as a video camera, smart phone, digital camera, or the like.

In operation, imaging device 420 may provide image data, either delayed or in real-time, to processor 412. Processor 412 may then execute computer-implementable instructions stored therein or stored within memory module 414, to remove any contrast reducing scattering medium present in the image data and cause a contrast enhanced image to be displayed to a user on display 240.

Figure 6:
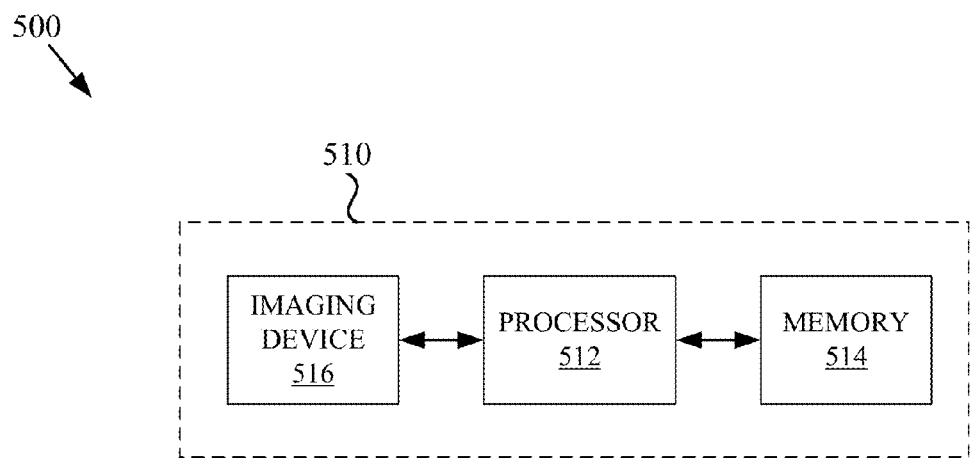

FIG. 6 shows a diagram 500 of illustrating an embodiment of a system 510 configured to perform the methods in accordance with the Single Image Contrast Enhancement Method Using the Adaptive Wiener Filter. System 510 includes a processor 512 operatively connected, such as via a wired or wireless connection, to a memory module 514 and imaging device 516. The components shown in FIG. 6 may be the same as or similar to the components shown in FIG. 5, with the difference being that system 510 includes imaging device 516, while system 410 is operatively connected to imaging device 420 and includes a separate display.

In operation, imaging device 516 may provide image data, either delayed or in real-time, to processor 512. Processor 512 may then execute computer-implementable instructions stored therein or stored within memory module 514, to remove any contrast reducing scattering medium present in the image data and cause a contrast enhanced image to be displayed to a user on imaging device 516.

Systems 400 and 500 may be configured with the appropriate software modules to perform the embodiments of the method, such as method 600, as discussed herein. As an example, processors 412 and 512 may have such modules stored therein, or, memory modules 414 and 514 may have such modules stored therein, which are accessed by processors 412 and 512, respectively. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof.

Figure 7:
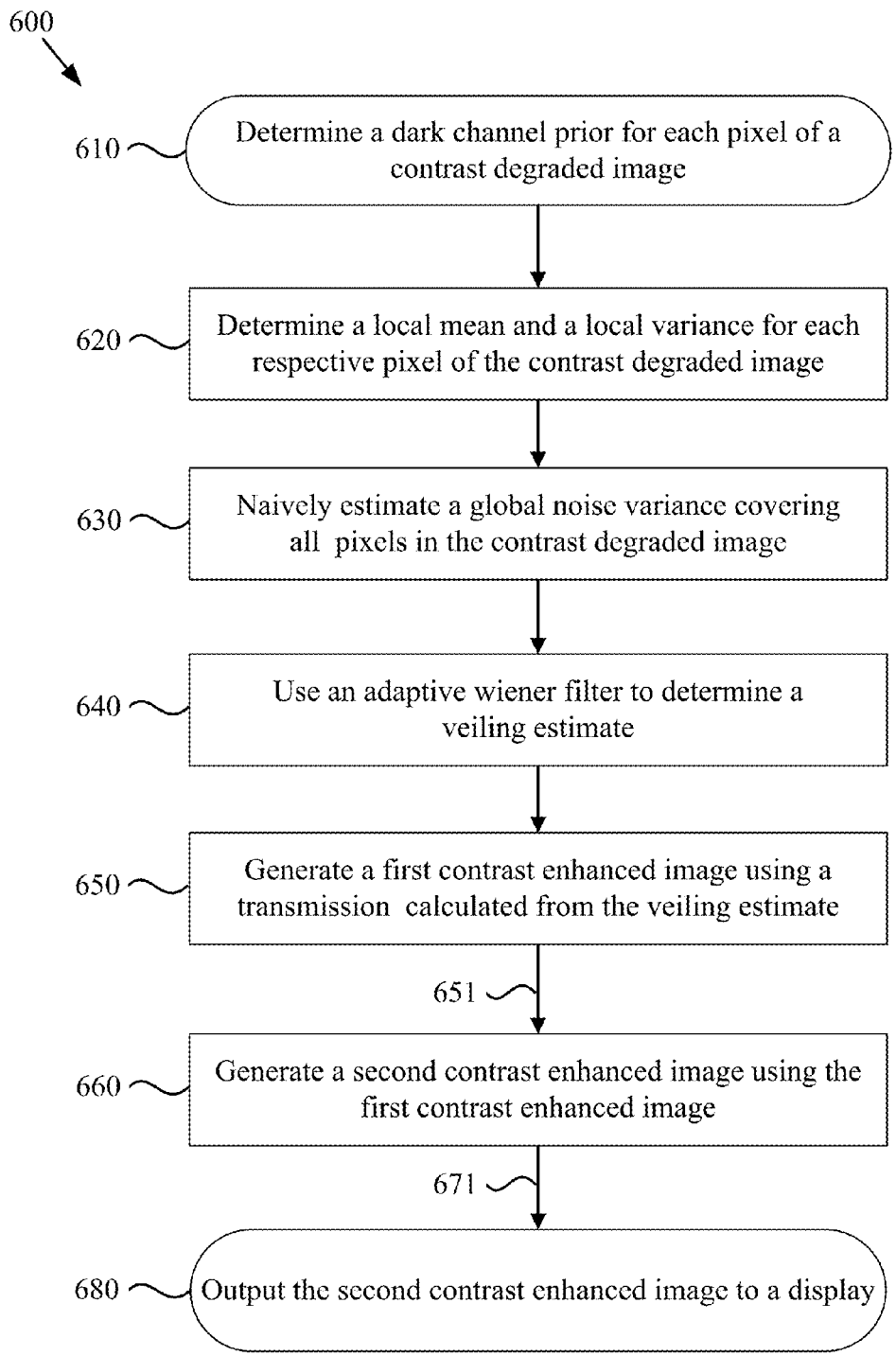
FIG. 7 shows a flowchart of an embodiment of a method in accordance with the Single Image Contrast Enhancement Method Using the Adaptive Wiener Filter.

FIG. 7 shows a flowchart of an embodiment of a method 600 in accordance with the Single Image Contrast Enhancement Method Using the Adaptive Wiener Filter. Method 600 disclosed herein may be implemented as a series of modules, either functioning alone or in concert with physical electronic and computer hardware devices. Such modules may be utilized separately and/or together locally and/or remotely to form a program product thereof, that may be implemented through recordable media. Method 600 may be implemented as a program product comprised of a plurality of such modules, which can be interactively displayed for a user on a display, such as display 416 or imaging device 516.

Some or all of the steps of method 600 may be stored on a non-transitory computer readable storage medium, wherein the steps are represented by computer-readable programming code. The steps of method 600 may also be computer-implemented using a programmable device, such as a computer-based system. Method 600 may comprise instructions that, when loaded into a computer-based system, cause the system to execute the steps of method 600. Method 600 may be computer-implemented using various programming languages, such as "Java", "C", or "C++". Further, method 600 may be implemented within a system such as system 400 shown in FIG. 5 or system 50 shown in FIG. 6.

For illustrative purposes, method 600 will be discussed with reference to the steps being performed by processors 412 or 512, using instructions stored therein or memory modules 414 or 514, respectively, with the contrast degraded image input provided by imaging devices 420 or 516, respectively and the contrast enhanced image output being displayed on display 416 or imaging device 516, respectively.

Additionally, while FIG. 7 shows one embodiment of method 600 to include steps 610-680, other embodiments of method 600 may contain fewer or more steps. Further, while in some embodiments the steps of method 600 may be performed as shown in FIG. 7, in other embodiments the steps may be performed in a different order, or certain steps may occur simultaneously with one or more other steps.

In general, method 600 comprises the steps of using an adaptive wiener filter, such as shown in FIG. 1, to generate a veiling estimate $\hat{v}_i$ for a dark channel prior $d_i$ of each pixel in a single image y having a contrast reducing scattering medium therein, such as image 210, wherein a global noise variance $\sigma_n^2$ for y is used to generate $\hat{v}_i$, wherein $\sigma_n^2$ is naively estimated using all M pixels in y, and generating a first contrast enhanced image $x_1$, such as image 240, using a transmission $t_i$, such as shown in FIG. 3B, calculated from $\hat{v}_i$. In particular, method 600 may begin with step 610, which involves determining a dark channel prior $d_i$ for each pixel of a single image y having a contrast reducing scattering medium, such as fog, haze, water, or dust, therein. Step 620 involves determining a local mean $\mu_{v,i}$ and a local variance $\sigma_{v,i}^2$ for each respective pixel of y using pixels located within a sample window $\Omega_i$ centered around the respective pixel of y and using the determined $d_i$ for the respective pixel of y. Step 630 involves naively estimating a global noise variance $\sigma_n^2$ covering all M pixels in y. In some embodiments, $\sigma_n^2$ is estimated using the equation $$\hat{\sigma}_n^2 = \frac{1}{M}\sum_{j=0}^{M-1}\sigma_{d,j}^2,$$

where j is a pixel in the image.

Method 600 may then proceed to step 640, which involves using an adaptive wiener filter to determine a veiling estimate $\hat{v}_i$ using $\sigma_n^2$. In some embodiments, $\hat{v}_i$ is generated using a sample window $\Omega_i$ centered on an image pixel and having a window size greater than one pixel by one pixel. In some embodiments, $\hat{v}_i$ is generated according to the equation $$\hat{v}_i = \mu_{v,i} + \frac{\sigma_{v,i}^2 - \sigma_n^2}{\sigma_{v,i}^2}(d_i - \mu_{v,i}),$$

where $\mu_{v,i}$ is a local mean of $\Omega_i$ and $\sigma_{v,i}^2$ is a local variance of $\Omega_i$. In such embodiments $\hat{\mu}_{v,i}$ is an estimate of $\mu_{v,i}$ and is determined according to the equation $$\hat{\mu}_{v,i} = \frac{1}{|\Omega_i|}\sum_{j\in\Omega_i}d_i,$$

where j is a pixel within the window $\Omega_i$. In such embodiments, $\hat{\sigma}_{v,i}^2$ is an estimate of $\sigma_{v,i}^2$ and is determined according to the equation $$\hat{\sigma}_{v,i}^2 = \frac{1}{|\Omega_i|}\sum_{j\in\Omega_i}d_i^2 - \hat{\mu}_v^2.$$

Step 650 involves generating a first contrast enhanced image $x_1$ using a transmission $t_i$ calculated from $\hat{v}_i$. In some embodiments, the step of generating $x_1$ is performed by the equation $$x_i = \frac{y_i - a}{\min(t_i, t_0)} + a,$$

where a is the airlight and $t_o$ is a number chosen for numerical soundness. As an example, $t_o$ may range from 0.001 to 0.1 to prevent significant errors due to divide by zero depending on the dynamic range of $y_i$. Method 600 may then proceed along flow path 651 to step 660. As discussed in more detail with reference to FIG. 8 below, step 660 then involves generating a second contrast enhanced image $x_2$ using a transmission $t_i$ calculated from the second veiling estimate. Method 600 may then proceed along flow path 671 to step 680, which involves outputting $x_2$ to a display, such as display 416 or imaging device 516.

Figure 8:
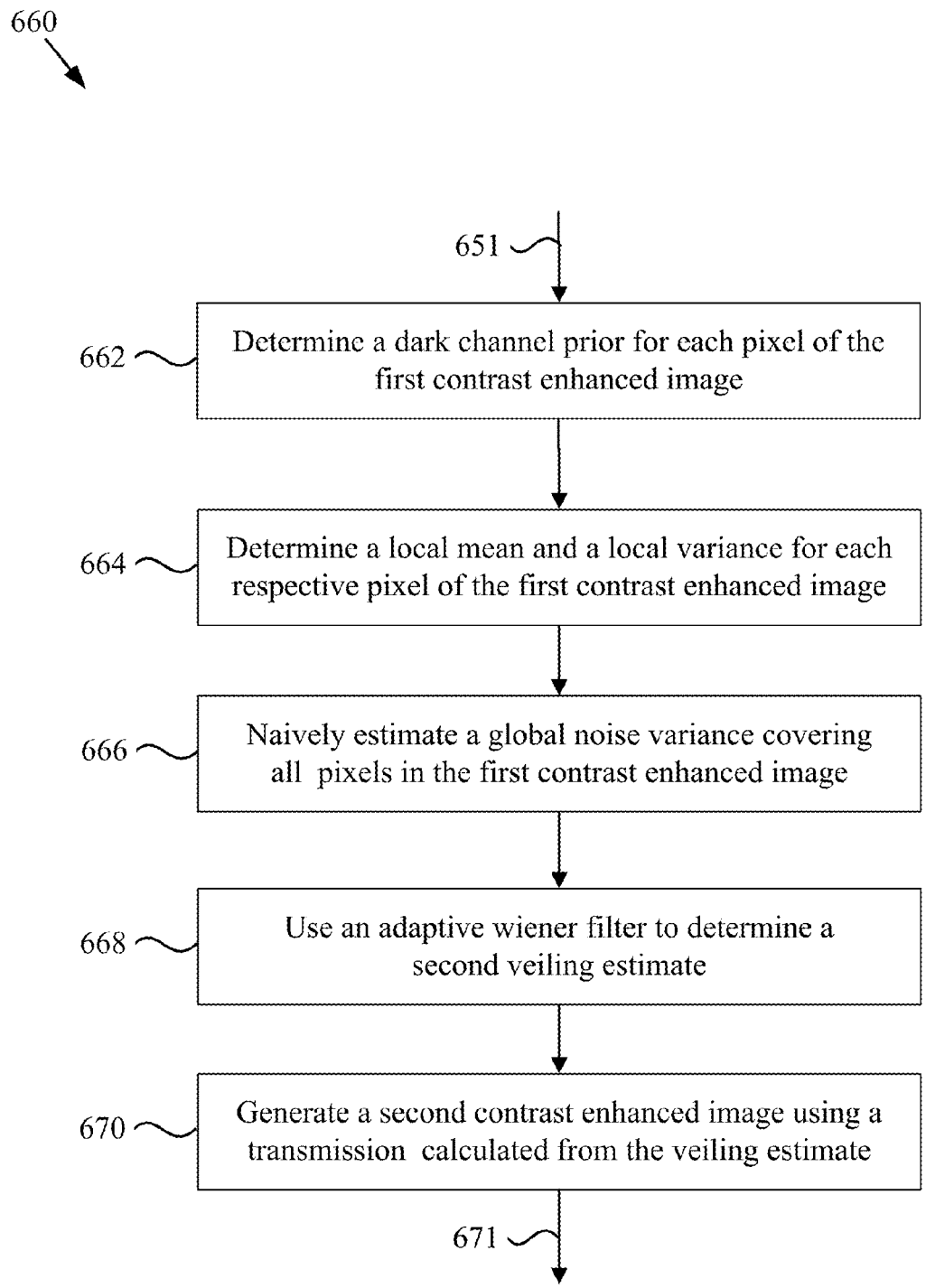
FIG. 8 shows a flowchart of an embodiment of a step for generating a second contrast enhanced image in accordance with the Single Image Contrast Enhancement Method Using the Adaptive Wiener Filter.

FIG. 8 shows a flowchart of an embodiment of step 660. In general, the step of generating $x_2$ comprises the steps of using an adaptive wiener filter to generate a veiling estimate $\hat{v}_i$ for a dark channel prior $d_i$ of each pixel in $x_1$, wherein a global noise variance $\sigma_n^2$ for $x_1$ is used to generate $\hat{v}_i$, wherein $\sigma_n^2$ is naively estimated using all M pixels in $x_1$, and generating $x_2$ using a transmission $t_i$ calculated from $\hat{v}_i$.

In particular, step 660 may begin with step 662, which involves determining a dark channel prior $d_i$ for each pixel of $x_1$. Step 664 involves determining a local mean $\mu_{v,i}$ and a local variance $\sigma_{v,i}^2$ for each respective pixel of $x_1$ using pixels located within a sample window $\Omega_i$ centered around the respective pixel of $x_1$ and using the determined $d_i$ for the respective pixel of $x_1$. Step 666 involves determining an updated global noise variance $\sigma_n^2$ covering all M pixels in $x_1$. Step 668 involves using an adaptive wiener filter to determine a second veiling estimate using the updated global noise variance. Step 670 involves generating a second contrast enhanced image $x_2$ using a transmission $t_i$ calculated from the second veiling estimate. Step 660 may then proceed along flow path 671 to step 680 shown in FIG. 7.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Single Image Contrast Enhancement Method Using the Adaptive Wiener Filter are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
using an adaptive wiener filter to generate a veiling estimate $\hat{v}_i$ for a dark channel prior $d_i$ of each pixel of an M total number of pixels in a single image y having a contrast reducing scattering medium therein, wherein a global noise variance $\sigma_n^2$ for the single image y is used to generate the veiling estimate $\hat{v}_i$, wherein the global noise variance $\sigma_n^2$ is naively estimated using all of the M total number of pixels in the single image y; and
generating a first contrast enhanced image $x_1$ using a transmission $t_i$ calculated from the veiling estimate $\hat{v}_i$.

2. The method of claim 1, wherein the veiling estimate $\hat{v}_i$ is generated using a sample window $\Omega_i$ centered around an image pixel and having a window size greater than one pixel by one pixel.

3. The method of claim 2, wherein the veiling estimate $\hat{v}_i$ is generated according to the equation $$\hat{v}_i = \mu_{v,i} + \frac{\sigma_{v,i}^2 - \sigma_n^2}{\sigma_{v,i}^2}(d_i - \mu_{v,i}),$$

where $\mu_{v,i}$ is a local mean of the sample window $\Omega_i$ and $\sigma_{v,i}^2$ is a local variance of the sample window $\Omega_i$.

4. The method of claim 3, wherein $\hat{\mu}_{v,i}$ is an estimate of $\mu_{v,i}$ and is determined according to the equation $$\hat{\mu}_{v,i} = \frac{1}{|\Omega_i|} \sum_{j \in \Omega_i} d_i,$$

where j is a pixel within the sample window $\Omega_i$, where $|\Omega_i|$ is a number of pixels within the sample window $\Omega_i$.

5. The method of claim 3, wherein $\hat{\sigma}_{v,i}^2$ is an estimate of $\sigma_{v,i}^2$ and is determined according to the equation $$\hat{\sigma}_{v,i}^2 = \frac{1}{|\Omega_i|} \sum_{j \in \Omega_i} d_i^2 - \hat{\mu}_v^2,$$

where j is a pixel within the sample window $\Omega_i$, where $|\Omega_i|$ is a number of pixels within the sample window $\Omega_i$, and $\hat{\mu}_v^2$ is an estimate of the local average veiling measured within the sample window $\Omega_i$.

6. The method of claim 1, wherein the global noise variance $\sigma_n^2$ is estimated using the equation $$\hat{\sigma}_n^2 = \frac{1}{M} \sum_{j=0}^{M-1} \sigma_{d,j}^2,$$

where j is a pixel in y and $\hat{\sigma}_n^2$ is an estimate of the global noise variance, and $\sigma_{d,j}^2$ is a local veiling variance measured within the sample window $\Omega_i$.

7. The method of claim 1, wherein the step of generating the first contrast enhanced image $x_1$ is performed by the equation $$\hat{x}_i = \frac{y_i - a}{\min(t_i, t_0)} + a,$$

where $\hat{x}_i$ is the enhanced pixel value, where a is the airlight estimated from a scene, $t_o$ is a number chosen to prevent dividing by zero and $y_i$ is a contrast degraded image of the single image y at pixel location i.

8. The method of claim 1 further comprising the step of generating a second contrast enhanced image $x_2$ using the first contrast enhanced image $x_1$.

9. The method of claim 8 wherein the step of generating the second contrast enhanced image $x_2$ comprises the steps of:
using an adaptive wiener filter to generate a veiling estimate $\hat{v}_i$ for a dark channel prior $d_i$ of each pixel in the first contrast enhanced image $x_1$, wherein a global noise variance $\sigma_n^2$ for the first contrast enhanced image $x_1$ is used to generate the veiling estimate $\hat{v}_i$, wherein the global noise variance $\sigma_n^2$ is naively estimated using all of the pixels in $x_1$; and
generating the second contrast enhanced image $x_2$ using a transmission $t_i$ calculated from the veiling estimate $\hat{v}_i$.

10. The method of claim 8 further comprising the step of outputting the second contrast enhanced image $x_2$ to a display.

11. The method of claim 1, wherein the veiling estimate $\hat{v}_i$ is generated using a sample window $\Omega_i$ centered around an image pixel, wherein the veiling estimate $\hat{v}_i$ is generated according to the equation $$\hat{v}_i = \mu_{v,i} + \frac{\sigma_{v,i}^2 - \sigma_n^2}{\sigma_{v,i}^2}(d_i - \mu_{v,i}),$$

where $\mu_{v,i}$ is a local mean of the sample window $\Omega_i$ and $\sigma_{v,i}^2$ is a local variance of the sample window $\Omega_i$, the method further comprising the steps of:
selecting an initial sample window size to estimate $\mu_{v,i}$ and $\sigma_{v,i}^2$; and
estimating an optimum window size $|\Omega|$ with $\Omega$ as the optimum window by selecting a size sufficient to filter scene texture $\hat{\mu}_v$ to a desired variance $\sigma_{e,\Omega}^2$, where $$\sigma^2_{e,\Omega} = \frac{\hat{\sigma}^2_{n_{txt}}}{|\Omega|},$$

where $\hat{\sigma}^2_{n_{txt}}$ is estimated using the average variance in all color channels of the single image y.

12. A method comprising the steps of:
   determining a dark channel prior $d_i$ for each pixel of an M total number of pixels of a single image y having a contrast reducing scattering medium therein;
   determining a local mean $\mu_{v,i}$ and a local variance $\sigma^2_{v,i}$ for each respective pixel of the M total number of pixels in the single image y using pixels located within a sample window $\Omega_i$ centered around the respective pixel of the single image y and using the determined dark channel prior $d_i$ for the respective pixel of the single image y;
   naively estimating a global noise variance $\sigma^2_n$ covering all of the M total number of pixels in the single image y;
   using an adaptive wiener filter to determine a veiling estimate $\hat{v}_i$ using the global noise variance $\sigma^2_n$; and
   generating a first contrast enhanced image $x_1$ using a transmission $t_i$ calculated from the veiling estimate $\hat{v}_i$.

13. The method of claim 12 further comprising the steps of:
   determining a dark channel prior $d_i$ for each pixel of the first contrast enhanced image $x_1$;
   determining a local mean $\mu_{v,i}$ and a local variance $\sigma^2_{v,i}$ for each respective pixel of the first contrast enhanced image $x_1$ using pixels located within a sample window $\Omega_i$ centered around the respective pixel of the first contrast enhanced image $x_1$ and using the determined dark channel prior $d_i$ for the respective pixel of the first contrast enhanced image $x_1$;
   determining an updated global noise variance $\sigma^2_n$ covering all of the pixels in $x_1$;
   using an adaptive wiener filter to determine a second veiling estimate using the updated global noise variance; and
   generating a second contrast enhanced image $x_2$ using a transmission $t_i$ calculated from the second veiling estimate.

14. The method of claim 13 further comprising the step of outputting the second contrast enhanced image $x_2$ to a display.

15. The method of claim 12 further comprising the steps of:
   selecting an initial sample window size to estimate the local mean $\mu_{v,i}$ and the local variance $\sigma^2_{v,i}$ for each respective pixel of the M total number of pixels in the single image y; and
   estimating an optimum window size $|\Omega|$ with $\Omega$ as the optimum window by selecting a size sufficient to filter scene texture $\hat{\mu}_v$ to a desired variance $\sigma^2_{e,\Omega}$, where $$\sigma^2_{e,\Omega} = \frac{\hat{\sigma}^2_{n_{txt}}}{|\Omega|},$$

where $\hat{\sigma}^2_{n_{txt}}$ is estimated using the average variance in all color channels of the single image y.

16. A system comprising:
   a processor operatively connected to an imaging device, wherein the processor is configured, via programming instructions accessible thereto, to perform the steps of:
   determining a dark channel prior $d_i$ for each pixel of a single image y received from the imaging device, wherein the single image y has a contrast reducing scattering medium therein;
   determining a local mean $\mu_{v,i}$ and a local variance $\sigma^2_{v,i}$ for each respective pixel of an M total number of pixels in the single image y using pixels located within a sample window $\Omega_i$ centered around the respective pixel of the single image y and using the determined dark channel prior $d_i$ for the respective pixel of the single image y;
   naively estimating a global noise variance $\sigma^2_n$ covering all of the M total number of pixels in the single image y;
   using an adaptive wiener filter to determine a veiling estimate $\hat{v}_i$ using the global noise variance $\sigma^2_n$; and
   generating a first contrast enhanced image $x_1$ using a transmission $t_i$ calculated from the veiling estimate $\hat{v}_i$.

17. The system of claim 16, wherein the processor is configured to generate the veiling estimate $\hat{v}_i$ according to the equation $$\hat{v}_i = \mu_{v,i} + \frac{\sigma^2_{v,i} - \sigma^2_n}{\sigma^2_{v,i}}(d_i - \mu_{v,i}),$$

where $\mu_{v,i}$ is a local mean of the sample window $\Omega_i$ and $\sigma^2_{v,i}$ is a local variance of the sample window $\Omega_i$, the method further comprising the steps of:
   selecting an initial sample window size to estimate the local mean $\mu_{v,i}$ and the local variance $\sigma^2_{v,i}$ for each respective pixel of an M total number of pixels in the single image y; and
   estimating an optimum window size $|\Omega|$ with $\Omega$ as the optimum window by selecting a size sufficient to filter scene texture noise to a desired variance $\sigma^2_{e,\Omega}$, where $$\sigma^2_{e,\Omega} = \frac{\hat{\sigma}^2_{n_{txt}}}{|\Omega|},$$

where $\hat{\sigma}^2_{n_{txt}}$ is estimated using the average variance in all color channels of the single image y.

18. The system of claim 17, wherein $\hat{\mu}_{v,i}$ is an estimate of $\mu_{v,i}$ and is determined according to the equation $$\hat{\mu}_{v,i} = \frac{1}{|\Omega_i|}\sum_{j \in \Omega_i} d_j,$$

where j is a pixel within the sample window $\Omega i$ and $|\Omega_i|$ is a number of pixels within the sample window $\Omega_i$, and wherein $\hat{\sigma}^2_{v,i}$ is an estimate of $\sigma^2_{v,i}$ and is determined according to the equation $$\hat{\sigma}^2_{v,i} = \frac{1}{|\Omega_i|}\sum_{j \in \Omega_i} d_j^2 - \hat{\mu}_v^2.$$

19. The system of claim 16, wherein the $\sigma^2_n$ is estimated using the equation $$\hat{\sigma}^2_n = \frac{1}{M}\sum_{j=0}^{M-1} \sigma^2_{d,j},$$

where j is a pixel in the single image y, and wherein the step of generating the first contrast enhanced image $x_1$ is performed by the equation $$\hat{x}_i = \frac{y_i - a}{\min(t_i, t_0)} + a,$$

where $\hat{x}_i$ is the enhanced pixel value, where a is the airlight estimated from a scene, and $t_o$ is a number chosen to prevent division by zero, and $y_i$ is a contrast degraded image of the single image y at pixel location i.

20. The system of claim 16, wherein the processor is further configured, via programming instructions accessible thereto, to perform the steps of:
  determining a dark channel prior $d_i$ for each pixel of the first contrast enhanced image $x_1$;
  determining a local mean $\mu_{v,i}$ and a local variance $\sigma_{v,i}^2$ for each respective pixel of the first contrast enhanced image $x_1$ using pixels located within a sample window $\Omega_i$ centered around the respective pixel of the first contrast enhanced image $x_1$ and using the determined $d_i$ for the respective pixel of the first contrast enhanced image $x_1$;
  determining an updated global noise variance $\sigma_n^2$ covering all of the pixels in the first contrast enhanced image $x_1$;
  using an adaptive wiener filter to determine a second veiling estimate using the updated global noise variance; and
  generating a second contrast enhanced image $x_2$ using a transmission $t_i$ calculated from the second veiling estimate.

\* \* \* \* \*